United States Patent
Schmitz et al.

(10) Patent No.: US 9,096,706 B2
(45) Date of Patent: Aug. 4, 2015

(54) PRODUCTION AND USE OF METAL SALTS OF ALKYL OXIDE AND/OR ARYL ALKYL OXIDE OLIGOMERS AND POLYMERS WITH ACID END GROUPS IN THE PRODUCTION OF POLYURETHANE SYSTEMS

(75) Inventors: Sarah Schmitz, Duisburg (DE); Roland Hubel, Essen (DE)

(73) Assignee: EVONIK DEGUSSA GMBH, Essen (DE)

( * ) Notice: Subject to any disclaimer, the term of this patent is extended or adjusted under 35 U.S.C. 154(b) by 267 days.

(21) Appl. No.: 13/640,236

(22) PCT Filed: Mar. 7, 2011

(86) PCT No.: PCT/EP2011/053358
§ 371 (c)(1),
(2), (4) Date: Oct. 9, 2012

(87) PCT Pub. No.: WO2011/124432
PCT Pub. Date: Oct. 13, 2011

(65) Prior Publication Data
US 2013/0035412 A1   Feb. 7, 2013

(30) Foreign Application Priority Data
Apr. 7, 2010 (DE) .................. 10 2010 003 672

(51) Int. Cl.
*C08G 18/08* (2006.01)
*C08G 18/24* (2006.01)
*C08G 18/48* (2006.01)
*C08G 101/00* (2006.01)

(52) U.S. Cl.
CPC .............. *C08G 18/244* (2013.01); *C08G 18/24* (2013.01); *C08G 18/242* (2013.01); *C08G 18/246* (2013.01); *C08G 18/4887* (2013.01); *C08G 2101/00* (2013.01); *C08G 2101/0083* (2013.01)

(58) Field of Classification Search
CPC .... C08G 18/24; C08G 18/242; C08G 18/244; C08G 18/246; C08G 18/4887
See application file for complete search history.

(56) References Cited

U.S. PATENT DOCUMENTS

| | | | |
|---|---|---|---|
| 3,278,457 A | 10/1966 | Milgrom | |
| 3,278,458 A | 10/1966 | Belner | |
| 3,278,459 A | 10/1966 | Herold | |
| 3,427,256 A | 2/1969 | Milgrom | |
| 3,427,334 A | 2/1969 | Belner | |
| 3,427,335 A | 2/1969 | Herold | |
| 4,495,105 A * | 1/1985 | Miller | .............................. 554/73 |
| 4,532,262 A | 7/1985 | Gloskey | |
| 5,051,521 A * | 9/1991 | Frances et al. | ................... 556/94 |
| 6,303,804 B1 | 10/2001 | Dougherty et al. | |
| 6,303,808 B1 * | 10/2001 | Knezevic et al. | .............. 556/105 |
| 6,720,447 B1 | 4/2004 | Ditrich et al. | |
| 7,273,942 B1 | 9/2007 | Dougherty et al. | |
| 2009/0012197 A1 * | 1/2009 | Landers et al. | ................ 521/170 |
| 2009/0088489 A1 | 4/2009 | Terheiden et al. | |
| 2010/0113633 A1 | 5/2010 | Henning et al. | |
| 2011/0015290 A1 | 1/2011 | Schmitz et al. | |
| 2011/0054055 A1 | 3/2011 | Schmitz et al. | |

FOREIGN PATENT DOCUMENTS

| | | |
|---|---|---|
| BE | 779607 | 6/1972 |
| DE | 2411480 | 9/1974 |
| DE | 19940797 A1 | 3/2001 |
| DE | 102004007561 B3 | 10/2005 |
| EP | 0 344 442 A1 | 12/1989 |
| EP | 1 013 704 A2 | 6/2000 |
| EP | 1 078 946 A1 | 2/2001 |
| EP | 1 167 410 A1 | 1/2002 |
| GB | 982 280 | 2/1965 |
| GB | 1 012 653 | 12/1965 |
| GB | 1 382 538 | 2/1975 |
| GB | 1 422 056 | 1/1976 |
| GB | 1 432 281 | 4/1976 |
| WO | WO 98/36007 | 8/1998 |

OTHER PUBLICATIONS

Randall, D., et. al., "Huntsman Polyurethans: The Polyurethanes Book", 2002 Verlag Wiley, pp. 140-144.
Herrington, R., et al., "Fliexible Polyurethane Foams", Dow Chemical, 1991, pp. 2.30.
Zech, Oliver et al., "Alkali Metal Oligoether Carboxylates—A New Class of Ionic Liquids", Chemistry—A European Journal (Jan. 26, 2009), vol. 15, No. 6, pp. 1341-1345.
International Search Report dated Jun. 10, 2011 issued in PCT/EP2011/053358 (previously submitted on Oct. 9, 2012).

* cited by examiner

*Primary Examiner* — Michael L Leonard
(74) *Attorney, Agent, or Firm* — Scully, Scott, Murphy & Presser, P.C.

(57) ABSTRACT

The invention relates to a catalyst system that is suitable for catalyzing the production of polyurethane foams. The catalyst system is characterized in that said system contains a metal salt of an alcohol that is modified with an acid end group.

10 Claims, No Drawings

PRODUCTION AND USE OF METAL SALTS OF ALKYL OXIDE AND/OR ARYL ALKYL OXIDE OLIGOMERS AND POLYMERS WITH ACID END GROUPS IN THE PRODUCTION OF POLYURETHANE SYSTEMS

The invention relates to the production and use of metal salts of acid-end-group-modified alkyl-oxide- and arylalkyl-oxide-containing oligomers and polymers and solutions of these in the production of polyurethane systems (PU systems).

Examples of polyurethane systems are polyurethane coatings, polyurethane adhesives, polyurethane sealants, polyurethane elastomers and polyurethane foams.

Polyurethane foams are used in a very wide variety of sectors because they have excellent mechanical and physical properties. The automobile industry and the furniture industry are a particularly important market for a very wide variety of types of PU foams, for example conventional flexible foams based on ether polyol and based on ester polyol, HR foams (often also called cold foams), rigid foams, integral foams and microcellular foams, and also foams having properties between those of these classifications, e.g. semirigid systems. By way of example, rigid foams are used as roof lining, ester foams are used for the internal cladding of doors, and also for die-cut sun visors, and HR and flexible foams are used for seat systems and mattresses.

Catalysts suitable for single-component moisture-reactive polyurethane compositions mostly comprise tin compounds, for example tin carboxylates, in particular tin octoate (also called tin 2-ethylhexanoate), frequently combined with tertiary amines.

By way of example, the use of tin octoate in the production of flexible PU foams based on polyetherols is described in Steve Lee, Huntsman Polyurethanes. The Polyurethanes Book, Verlag Wiley, p. 140, 143-144 and Ron Herrington, Flexible Polyurethane Foams, Dow Chemical, p. 2.30. The tin octoate serves as catalyst for the reaction of isocyanates with polyols (another term used being gel catalyst) by way of a complex transition state. During production of the foam, the tin octoate hydrolyzes, liberating the acid itself alongside the 2-ethylhexanoic salt. Although the decomposition is desirable because this method suppresses the reverse reaction of the urethane bond to give the starting materials, the resultant liberation of possibly toxic substances should be avoided as far as possible. The patent literature also reveals numerous applications which describe the use of said tin octoate, examples being BE 779607, GB 1432281, GB 1422056, GB 1382538, GB 1012653, and GB 982280. Preferred catalyst systems used in said specifications are those that comprise tin octoate.

However, these tin catalysts have recently been subject to increasing pressure from users on grounds of toxicity in relation to the starting materials used for their production, in particular the ligands. There is therefore an increasing requirement for less toxic alternatives.

In recent years, the automobile industry and furniture industry, and foam suppliers to these industries, have been subjected to increasingly stringent requirements relating to emission specifications and toxicity specifications, and in order to comply with these catalyst systems have already been developed which are less toxic and which comprise ligands that can be polymerized into the foam. Systems of this type are described by way of example in EP 1013704. Natural ricinoleic acid is used here, and tin content in the final product can therefore vary, and production problems can arise because of inadequate phase separation or filterability. The products obtained are moreover highly viscose and are therefore mostly processable only in dilute form.

Abovementioned systems have hitherto represented one of the few alternatives to the widely used tin octoate catalyst system (tin(II) salt of 2-ethylhexanoic acid) and organotin compounds, such as dibutyltin dilaurate. The latter systems have to be considered critical in respect of the toxicity of the substances emitted. 2-ethylhexanoic acid is liberated by way of example during and after the foaming process and is a cause of concern because of possible embryotoxic effects in humans (R 63).

Bismuth catalysts represent another alternative to the conventional tin catalysts. Examples of known bismuth catalysts for polyurethane compositions are bismuth carboxylates, e.g. bismuth octoate (bismuth salt of 2-ethylhexanoic acid), as mentioned in WO 98/36007. However, the catalytic activity of bismuth compounds in relation to the isocyanate-water reaction is markedly smaller than that of tin catalysts, and emission of 2-ethylhexanoic acid is also a problem with this catalyst system.

It was therefore an object of the present invention to provide a catalyst system which has fewer of the abovementioned disadvantages.

Surprisingly, it has now been found that catalyst systems as claimed in claim 1 achieve this object.

The invention therefore provides catalyst systems which are suitable for catalyzing the production of polyurethane systems and which are characterized in that the catalyst systems comprise at least one metal salt of a carboxylic acid of formula (I)

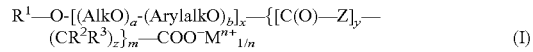

$$R^1\text{—O-}[(\text{AlkO})_a\text{-}(\text{ArylalkO})_b]_x\text{—\{[C(O)—Z]}_y\text{—} (CR^2R^3)_z\}_m\text{—COO}^-M^{n+}{}_{1/n} \quad (I)$$

where
$R^1$=linear, branched or cyclic hydrocarbon moiety having from 1 to 10 carbon atoms, Z=saturated or unsaturated, aliphatic, aromatic or mixed-aliphatic-aromatic, linear, branched, or cyclic hydrogen moiety having from 1 to 30 carbon atoms optionally with further heteroatoms, preferably selected from nitrogen, oxygen, sulfur and phosphorus, $R^2$ and $R^3$=mutually independently H or a linear or branched hydrocarbon moiety having from 1 to 10 carbon atoms, preferably H or methyl, with preference H, x=from 0 to 10, preferably from 1 to 5, with preference from 1 to 2, y=0 or an integer≥1, preferably from 1 to 3, with preference 1, where y is with particular preference 0 if z=1, z=0 or an integer≥1, preferably from 1 to 3, with preference 1, where z is with particular preference 0 if y=1, m=an integer≥1, preferably 1, n=an integer≥1, preferably from 1 to 3, with preference 1, M=metal AlkO=identical or different alkylene oxide units, ArylalkO=identical or different arylalkylene oxide units, a=from 0 to 20, preferably from 1 to 5, b=from 0 to 20, preferably from 1 to 5, a+b≥0, preferably ≥1, where the units indicated by the indices a and b can have blockwise or random distribution, in any desired sequence in the molecule.

The present invention also provides the use of catalyst systems of this type in the production of polyurethane systems, and also corresponding polyurethane systems, in particular polyurethane foams, and use of these.

An advantage of the catalyst system of the invention is that it is suitable not only for producing flexible foams based on ether polyols and on ester polyols but also for producing rigid foams, and also foams having properties between those of these classifications, e.g. semirigid foams.

Unlike catalyst systems based on natural acids which act as emulsifiers, for example ricinoleic acid, the catalyst systems of the invention can be synthesized rapidly and at low cost, without problems such as inadequate phase separation.

A great advantage of the catalyst systems of the invention is that during production of the catalyst to be added the viscosity thereof can be adjusted as desired, by virtue of the variable polymer chain length. Properties such as tin content, molecular weight, and therefore also the activity/reactivity of the catalyst system can moreover be adjusted as desired.

The catalyst system of the invention moreover permits production of polyurethane systems with use of nontoxic starting materials which do not emit any toxic cleavage products, even under extreme thermal conditions. As a function of the molecular weight of the polymeric catalyst ligands, escape of these from the foam is minimal to undetectable. These advantages can be achieved without any change in, or significant impairment of, the other physical properties such as density, hardness, rebound resilience, or compressive strength.

The catalyst systems of the invention, the process for producing the polyurethane foams, the polyurethane foams themselves, and also uses of these, are described below by way of example, without any intention that the invention be restricted to these examples. Where ranges, general formulae, or classes of compound are given below, these are intended to encompass not only the corresponding ranges or groups of compounds explicitly mentioned but also all of the subranges and subgroups of compounds which can be obtained by extracting individual values (ranges) or compounds. Where documents are cited for the purposes of the present description, the entire content of these, in particular the factual content to which reference is made, is intended to be part of the disclosure of the present invention.

A feature of the catalyst system of the invention, which is suitable for catalyzing the production of polyurethane foams, is that it comprises a metal salt of an acid-end-group-modified alcohol which has optionally been modified with alkyl-oxide- and/or arylalkyl-containing oligomer or polymer. A particular feature of the catalyst system of the invention is that the catalyst system comprises a metal salt of a carboxylic acid of formula (I)

$$R^1\text{—O-}[(\text{AlkO})_a\text{-}(\text{ArylalkO})_b]_x\text{—}\{[\text{C(O)—Z}]_y\text{—}(\text{CR}^2\text{R}^3)_z\}_m\text{—COO}^-\text{M}^{n+}{}_{1/n} \qquad (I)$$

where $R^1$=linear, branched or cyclic hydrocarbon moiety, preferably alkyl moiety having from 1 to 20, preferably from 1 to 6, and with preference from 2 to 4, carbon atoms, Z=saturated or unsaturated, aliphatic, aromatic or mixed-aliphatic-aromatic, linear, branched, or cyclic hydrogen moiety having from 1 to 30 carbon atoms optionally with further heteroatoms, preferably selected from nitrogen, oxygen, sulfur and phosphorus, where Z is with preference a saturated or unsaturated aliphatic or aromatic moiety having from 1 to 10, preferably from 2 to 6, carbon atoms, and comprising no heteroatom or only oxygen, particular preference being given to an unsaturated or saturated linear aliphatic moiety having from 2 to 6 carbon atoms and comprising no heteroatom, $R^2$ and $R^3$=mutually independently H or a linear or branched hydrocarbon moiety having from 1 to 10 carbon atoms, preferably H or methyl, with preference H, x=from 0 to 10, preferably from 1 to 5, with preference from 1 to 2, y=0 or an integer≥1, preferably from 1 to 3, with preference 1, where y is with particular preference 0 if z=1, z=0 or an integer≥1, preferably from 1 to 3, with preference 1, where z is with particular preference 0 if y=1, m=an integer≥1, preferably 1, n=an integer≥1, preferably from 1 to 3, with preference 1, M=metal AlkO=identical or different alkylene oxide units, ArylalkO=identical or different arylalkylene oxide units, preferably styrene oxide units, a=from 0 to 20, preferably from 1 to 20, and with preference from 2 to 10, b=from 0 to 20, preferably from 0 to 10, and with preference 1 or 2, a+b≥0, preferably ≥1, with preference from 1 to 20, with particular preference from 2 to 12, and with very particular preference from 2 to 5, where the units indicated by the indices a and b can have blockwise or random distribution, preferably having blockwise arrangement in any desired sequence in the molecule.

An example of a metal salt of the formula (I) in which Z=—CH═CH—, AlkO=EO, a=2, b=0, x=1, y=1, z=0, and m=1, is a compound of the following formula (Ia).

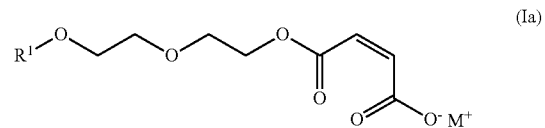
(Ia)

An example of a metal salt of the formula (I), in which Z is a 6-membered ring, AlkO=EO, a=2, b=0, x=1, y=1, z=0, and m=1, is a compound of the following formula (Ib).

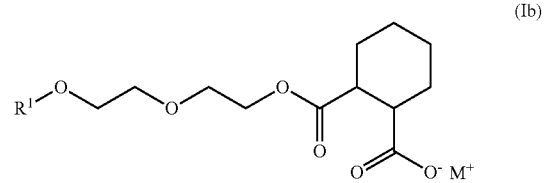
(Ib)

It is preferable that the catalyst system of the invention comprises a salt of the formula (I) which complies with the formula (II):

$$R^1\text{—O-}[(\text{EO})_c\text{—}(\text{PO})_d\text{—}(\text{BO})_e\text{—}(\text{SO})_f]_x\text{—}\{[\text{C(O)—}Z]_y\text{—}(\text{CR}^2\text{R}^3)_z\}_m\text{—COO}^-\text{M}^{n+}{}_{1/n} \qquad (II)$$

where $R^1$, $R^2$, $R^3$, Z, m, n, x, y, z, and M are as defined above,

EO=ethylene oxide unit,

PO=propylene oxide unit, where the propylene moiety can be linear or branched,

BO=butylene oxide unit, where the butylene moiety can be linear or branched,

SO=styrene oxide unit, c=from 0 to 20, preferably from 0 to 10, with preference from 1 to 5, d=from 0 to 20, preferably from 0 to 10, with preference from 1 to 5, e=from 0 to 20, preferably from 0 to 10, with preference from 1 to 5, f=from 0 to 20, preferably from 0 to 10, with preference from 1 to 5, c+d+e+f≥1, preferably from 2 to 20, with preference from 2 to 5, where the units indicated by the indices c, d, e, and f can have blockwise or random distribution, preferably having blockwise arrangement in any desired sequence in the molecule.

The preferred use of short-chain monools ($R^1$=alkyl moiety having from 1 to 6 carbon atoms), e.g. methanol, ethanol, (iso)propanol, or butanol as starting alcohol (from which the $R^1$ moiety derives) can achieve an absence of branching in, and the presence of no more than one reactive group in, the polyetherols.

Preferred catalyst systems are:

A) those where in formula (II) f=0, c and/or d and e are respectively not equal to 0, and the sum c+d and, respectively, c+e and, respectively, d+e=from 2 to 5 or c+d+e=from 3 to 5, preferably those where $R^1$ is a butyl, isopropyl, tert-butyl, 3,5,5-trimethyl-1-hexyl, or 2-octyldodecyl moiety, B) those where in formula (II) c, e, and f=0, and d is from 1 to 3, preferably those where $R^1$ is a butyl moiety, C) those where in formula (II) d, e, and f=0, and c is from 1 to 3, preferably those where $R^1$ is a butyl moiety, D) those where in formula (II) d and f=0, c and e are respectively not equal to 0, and the sum c+e=from 2 to 4, preferably those where $R^1$ is a butyl, isopropyl, tert-butyl, 3,5,5-trimethyl-1-hexyl or 2-octyldodecyl moiety, or E) those where in formula (II) d and e=0, c and f are respectively not equal to 0, and the sum c+f=from 2 to 4, preferably those where $R^1$ is a butyl, isopropyl, tert-butyl, 3,5,5-trimethyl-1-hexyl or 2-octyldodecyl moiety.

Particularly preferred catalyst systems are those which comprise salts of the formula (I) or (II), in particular the preferred salts of the formula (II), in which M=Sn, n=2, z=1, m=1, and y=0.

The selection of the compound of the formula (I) or (II) is preferably such that the molar mass thereof is at least 90 g/mol, preferably from 120 to 600 g/mol, with preference from 160 to 300 g/mol.

The metal salts of the formula (I) or (II) are preferably salts of the metals of main group Ia, IIa, IVa, or Va, or of transition group Ib, IIb, or VIIIb of the periodic table of the elements (CAS notation). Preferred salts are those of the metals Na, K, Mg, Ca, Sn, Pb, Bi, Zn, Cu, Fe, Co, or Ni, preferably salts of tin, of zinc, or of bismuth, with preference of tin.

The catalyst system can comprise exclusively the metal salts, or can comprise the metal salts in combination with one or more solvents, e.g. water and/or one or more organic solvents. It is preferable that the catalyst system comprises one or more organic solvents. With preference, the catalyst system comprises at least one organic aprotic solvent. If the catalyst system comprises an organic solvent, this is preferably one selected from polyols, esters, polyesters, olefins, phthalates, end-capped polyethers, or mineral oils. If the metal salt is used in solution or in combination with a solvent, the ratio by weight of metal salt to solvent is preferably from 100:1 to 1:2, with preference from 50:1 to 1:1 and particularly from 25:1 to 2:1.

The catalyst system can comprise, alongside the metal salt(s), and alongside one or more solvents, further components, e.g. one or more tertiary amines, one or more silicone stabilizers, and optionally one or more emulsifiers. However, it is preferably in separate or dissolved form.

The metal salts of the formula (I) of the invention can by way of example be obtained by taking a monool ($R^1$—OH, where $R^1$ is as stated above) or an oligomeric or polymeric ether (hereinafter termed polyetherol) started by means of a corresponding monool and reacting this with a compound which is suitable for replacing the hydrogen atom of the monool or polyetherol by a carboxylic acid group or a corresponding carboxylic salt.

Suitable compounds of this type, which are hereinafter termed carboxylating agents, are by way of example carboxylic acids having alkyl moieties substituted by a halogen or by a tosyl group, or metal salts of these carboxylic acids, in particular alkali metal salts, in particular potassium salts or sodium salts, tin salts, bismuth salts, or zinc salts, or else di- or polycarboxylic acids, e.g. aromatic dicarboxylic acids, for example phthalic acid, terephthalic acid, isophthalic acid, and 1,8-naphthalenedicarboxylic acid, heterocyclic dicarboxylic acids, for example quinolinic acid and pyrazine-2,3-dicarboxylic acid, dicarboxylic acids having double bonds, for example fumaric acid, maleic acid, and methyltetrahydrophthalic acid, aliphatic dicarboxylic acids, for example succinic acid, glutaric acid, diglycolic acid, 3-methylglutaric acid, hexahydroterephthalic acid, hexahydrophthalic acid, adipic acid, pimelic acid, subaric acid, azeleic acid, sebacic acid, or anhydrides thereof, such as maleic, succinic, glutaric, diglycolic, phthalic, or hexahydrophthalic anhydrides. Examples of preferred carboxylating agents are monochloroacetic acid, monobromoacetic acid, or 3-chloropropanoic acid, or metal salts thereof, or else succinic or maleic anhydride.

Once the monool or the polyetherol has reacted with the carboxylating agent it can be advantageous to react the resultant reaction product with $SnCl_2$. This reaction can be carried out as described in U.S. Pat. No. 4,532,262.

Any of the processes known in the prior art can be used to obtain suitable polyethers. Preferred processes for producing alkoxylation products (polyethers) use basic catalysts, for example alkali metal hydroxides and alkali metal methoxides (methylates). The use of potassium hydroxide or potassium methoxide (methylate) is particularly widespread and has been known for many years. In a typical method, the starting alcohol, e.g. ethanol, propanol, butanol, pentanol, hexanol, octanol, or nonanol, is reacted with an alkylene oxide, such as ethylene oxide, propylene oxide, or butylene oxide, or with an arylalkylene oxide, e.g. styrene oxide, or a mixture of said compounds, to give a polyoxy(aryl)alkylene polyether, in the presence of an alkaline catalyst. The base-catalyzed production of polyethers is described by way of example in EP-A-1431331. There are also acidic-catalysis systems known for the alkoxylation reaction, in addition to the base-catalyzed reaction: DE 10 2004 007561 describes the use of $HBF_4$ and of Lewis acids such as $BF_3$, $AlCl_3$, and $SnCl_4$, as catalysts in the production of polyethers. However, it is also possible to use multimetal cyanide compounds or double-metal cyanide catalysts, also commonly known as DMC catalysts, as catalysts for producing polyether alcohols. The use of DMC catalysts minimizes the content of unsaturated byproducts. The reaction moreover proceeds with markedly higher space-time yield when comparison is made with the conventional basic catalysts. The production and use of double-metal cyanide complexes as catalysts has been known since the 1960s and is described by way of example in U.S. Pat. No. 3,427,256, U.S. Pat. No. 3,427,334, U.S. Pat. No. 3,427,335, U.S. Pat. No. 3,278,457, U.S. Pat. No. 3,278,458, and U.S. Pat. No. 3,278,459.

The catalyst system of the invention can in particular be used for producing polyurethane coatings, polyurethane adhesives, polyurethane sealants, polyurethane elastomers, or polyurethane foams, preferably for producing polyurethane foams. The catalyst system of the invention is added here to the reaction mixture prior to or during the reaction (for forming the urethane bonds), preferably being metered into the mixture with the aid of a mixing head.

As described, the catalyst system can comprise further components, e.g. water, tertiary amine, silicone stabilizer, and optionally emulsifier. This type of solution of the catalyst is often termed activator solution. However, it is preferable that the catalyst system is added separately, optionally dissolved in a polyether polyol.

In the process of the invention, preference is given to the direct metering, into the mixture, of a catalyst system which comprises exclusively the metal salt(s). When the catalyst system is metered directly into the mixture, the salts of the formula (I) should preferably be in liquid form, in order to ensure easy addition without the use of solvent.

By changing the chain length of the acid or the selection of the reactants it is possible to vary not only viscosity but also metal content of the catalyst system, and it is therefore possible to adjust to ideal reactivity and viscosity for the respective system. In contrast, direct metering of the viscose tin ricinoleate (salt of ricinoleic acid) into the polyurethane system components, in particular foaming components, can lead to problems because of its very high viscosity. Since many foamers only have a direct metering system available, a product which can be appropriately adapted individually to the prevailing conditions is highly advantageous.

As an alternative to the direct foaming process, it is also possible to meter the catalyst system in dilute form into the mixture. Anhydrous solutions are preferable here, since some transition metal salts have only limited resistance to hydrolysis.

The catalyst systems of the invention can be used as catalysts in the conventional formulations for producing polyurethane systems, in particular polyurethane foams, composed of one or more organic isocyanates having two or more isocyanate functions, one or more polyols having two or more groups reactive toward isocyanates, optionally further catalysts for the isocyanate-polyol and/or isocyanate-water and/or isocyanate-trimerization reactions, water, optionally physical blowing agents, optionally flame retardants, and optionally further additives.

Isocyanates suitable for the purposes of this invention are preferably any of the polyfunctional organic isocyanates, for example diphenylmethane 4,4'-diisocyanate (MDI), toluene diisocyanate (TDI), hexamethylene diisocyanate (HMDI), and isophorone diisocyanate (IPDI). The mixture known as "polymeric MDI" ("crude MDI"), made of MDI and of analogs of higher condensation level, with an average functionality of from 2 to 4, is particularly suitable, as also are the various isomers of TDI in pure form or as isomer mixture.

Suitable polyols for the purposes of this invention are preferably any of the organic substances having a plurality of groups reactive toward isocyanates and also preparations involving these. Preferred polyols are any of the polyether polyols and polyester polyols usually used for producing polyurethane systems, in particular polyurethane foams. Polyether polyols are obtained through reaction of polyfunctional alcohols or amines with alkylene oxides. Polyester polyols are based on esters of polyfunctional carboxylic acids, which can be either aliphatic, an example being adipic acid, or aromatic, an example being phthalic acid or terephthalic acid with polyfunctional alcohols (mostly glycols). It is also possible to use polyethers based on natural oils (natural oil based polyols, NOPs). These polyols are obtained from natural oils such as soy oil or palm oil and can be used in unmodified or modified form.

A suitable ratio of isocyanate and polyol, expressed as formulation index, is in the range from 10 to 1000, preferably from 40 to 350. This index describes the ratio of isocyanate actually used to calculated isocyanate (for a stoichiometric reaction with polyol). An index of 100 represents a molar ratio of 1:1 for the reactive groups.

Suitable amounts used of the catalyst system of the invention depend on the type of the catalyst and are usually in the range from 0.01 to 5 pphp (=parts by weight of compounds of the formula (I) or (II), based on 100 parts by weight of polyol), preferably from 0.05 to 1 pphp. In the case of, for example, a foam weighing 400 g (400 g~0.11.4 mol of polyol) this corresponds to use of a molar amount of from $1*10^{-5}$ to $1*10^{-2}$ mol.

Suitable further catalysts which can be used additionally in the process of the invention are substances which catalyze the gel reaction (isocyanate-polyol), the blowing reaction (isocyanate-water), or the di- or trimerization of isocyanate. Typical examples are amines, for example triethylamine, dimethylcyclohexylamine, tetramethylethylenediamine, tetramethylhexanediamine, pentamethyldiethylenetriamine, pentamethyldipropylenetriamine, triethylenediamine, dimethylpiperazine, 1,2-dimethylimidazole, N-ethylmorpholine, tris(dimethylaminopropyl)hexahydro-1,3,5-triazine, dimethylaminoethanole, dimethylaminoethoxyethanole, and bis(dimethylaminoethyl)ether, tin compounds, such as dibutyl tin dilaurate and potassium salts, such as potassium acetate. Further catalysts used preferably comprise those which comprise no tin compounds, in particular no dibutyl tin dilaurate.

Suitable amounts used of these additional catalysts depend on the type of the catalyst and are usually in the range from 0.01 to 5 pphp (=parts by weight, based on 100 parts by weight of polyol), or from 0.1 to 10 pphp for potassium salts.

In the present invention, suitable water contents in the process of the invention depend on whether physical blowing agents are also used or not, in addition to the water. For purely water-blown foams, the values are typically from 1 to 20 pphp, but if other blowing agents are used additionally, the amount used usually decreases to 0 or from 0.1 to 5 pphp. High foam densities are achieved by using neither water nor other blowing agents.

Physical blowing agents suitable for the purposes of this invention are gases, for example liquefied $CO_2$, and volatile liquids, for example hydrocarbons having 4 or 5 carbon atoms, preferably cyclo-, iso-, and n-pentane, fluorocarbons, preferably HFC 245fa, HFC 134a, and HFC 365mfc, fluorochlorocarbons, preferably HCFC 141b, oxygen-containing compounds, such as methyl formate and dimethoxymethane, or chlorinated hydrocarbons, preferably dichloromethane and 1,2-dichlorethane. Ketones (e.g. acetone) or aldehydes (e.g. methylal) are moreover suitable as blowing agents.

It is also possible to use, alongside water and optionally physical blowing agents, other chemical blowing agents which react with isocyanates with evolution of gas, an example being formic acid or carbonates.

Flame retardants suitable for the purposes of this invention are preferably liquid organophosphorus compounds, such a halogen-free organic phosphates, e.g. triethyl phosphate (TEP), halogenated phosphates, e.g. tris(1-chloro-2-propyl) phosphate (TCPP), and tris(2-chloroethyl)phosphate (TCEP), and organic phosphonates, e.g. dimethyl methanephosphonate (DMMP), dimethyl propanephosphonate (DMPP), or solids, such as ammonium polyphosphate (APP) and red phosphorus. Other suitable flame retardants are halogenated compounds for example halogenated polyols, and also solids, such as melamine and expandable graphite.

The formulations can be processed to give foams by any of the processes familiar to the person skilled in the art, for example, by the manual mixing process or preferably with the aid of high-pressure foaming machines. Batch processes can be used here, for example in the production of molded foams, refrigerators, and panels, or continuous processes can be used, for example for insulating sheets, metal-composite elements, slabs, or in spray processes.

Polyurethane systems, in particular polyurethane foams, that can be obtained by the process of the invention feature the presence of at least one of the salts of the formula (I), preferably salts of the formula (II).

A feature of preferred polyurethane systems of the invention, in particular polyurethane foams, is that the proportion by mass of salts of the formula (I) is from 0.001 to 5% by mass, based on the weight of the entire foam, preferably from 0.01 to 1.5% by mass.

The polyurethane systems of the invention can by way of example be polyurethane coatings, polyurethane adhesives, polyurethane sealants, polyurethane elastomers, or polyurethane foams, in particular a flexible polyurethane foam, a rigid polyurethane foam, a viscoelastic foam, an HR foam, a semirigid polyurethane foam, a thermoformable polyurethane foam or an integral foam. The term polyurethane here is to be understood as a generic term for a polymer produced from di- or polyisocyanates and from polyols or other species reactive toward isocyanate, e.g. amines, where the urethane bond does not have to be an exclusive or predominant type of bond. Polyisocyanurates and polyureas are expressly also included.

The polyurethane systems of the invention, in particular the polyurethane foams, can be used by way of example as refrigerator-insulation material, insulation sheet, sandwich element, pipe insulation, spray foam, single- & 1.5-component canister foam, wood-imitation product, modeling foam, packaging foam, mattresses, furniture cushioning, automobile-seat cushioning, headrest, instrument panel, automobile-interior cladding product, automobile roof lining, sound-deadening material, steering wheel, shoe sole, carpet-backing foam, filter foam, sealant foam, sealant, or adhesive.

The examples listed below describe the present invention by way of example, but there is no intention that the invention, the breadth of application of which is apparent from the entire description and from the claims, be restricted to the embodiments mentioned in the examples.

EXAMPLES

The polyetherol was synthesized as in the reaction specification in the patent DE 199 40 797 A1, synthesis example polyalkylene oxide A1.

Example A

Production of Salts of Oligomeric Polymeric Acids by Reaction with Carboxylating Agent 0.5 mol of the polyethers listed in Table 1 were converted under nitrogen into the respective alcoholate by adding 0.5 mol of sodium methoxide (methylate) in a three-necked flask with thermometer and reflux condenser at room temperature and then removing methanol by distillation at 110° C. in vacuo. After about 2 h, nitrogen is introduced to relieve the vacuum and the mixture is cooled to 80° C.

Addition of 0.5 mol of sodium monochloroacetate at 80° C. then gave a corresponding polyether having acid end group. The reaction mixture was stirred at 110° C. for about 4 h.

The resultant intermediates were converted, as described in example 4 of U.S. Pat. No. 4,532,262, to the corresponding tin(II) compound.

Example B

Production of Salts of Oligomeric and Polymeric Acids by Reaction with Anhydride The product was synthesized as in the reaction specification in the patent DE 2 411 480A, synthesis example 1.

The resultant intermediates were converted, as described in example 4 of U.S. Pat. No. 4,532,262, to the corresponding tin(II) compound.

TABLE 1

Polyethers used and tin content of the resultant catalysts

| Example | Starting alcohol | Alkylene/ Arylalkylene oxide units | Tin(II) content in catalyst | |
| --- | --- | --- | --- | --- |
| | | | theor. | determined |
| Ab | Butanol | 2 EO | 21 | 21.5 |
| Ac | Butanol | 2 x EO, 2 x PO | 15 | 14.7 |
| Ad | Butanol | 2 x PO | 19 | 19.2 |
| Ae | Butanol | 2 x PO, 2 x EO | 15 | 14.4 |
| Af | TMHP | 2 x EO | 17 | 14.0 |
| Ag | Butanol | 1 x SO, 2 x EO | 15 | 12.0 |
| Ah | Butanol | 2 x SO, 2 x EO | 11 | 8.0 |
| Ai | Butanol | 1 x BO, 2 x EO | 17 | 15.7 |
| Aj | Butanol | 2 x BO, 2 x EO | 14 | 12.8 |
| Bb[1] | Butanol | 2 EO | 18.5 | 12.0 |
| Bc[2] | Butanol | 2 EO | 17.5 | 15.5 |

[1]Synthesis using maleic anhydride
[2]Synthesis using glutaric anhydride
EO = ethylene oxide, PO = propylene oxide, SO = styrene oxide, BO = butylene oxide The (total) tin value was determined by means of optical emission spectrometry, after sulfuric acid digestion. An inductively coupled plasma was used for excitation. Cobalt was used as internal standard.

Once the material had been subjected to acidic saponification with hydrochloric acid under inert gas, tin(II) values are determined by titration with the aid of an iodine solution.

Examples 1 to 11

Production of Polyurethane Foams

The following formulation was used for producing the polyurethane foams: 100 parts by weight of polyetherol (hydroxy number=47 mg KOH/g, from 11-12% by weight of EO), 4 parts by weight of water, 1 part by weight of TEGOSTAB® BF 2370 (trademark of Th. Goldschmidt AG) (silicone stabilizer), 0.1 part by weight of TEGOAMIN® ZE 1 (amine catalyst from Evonik Goldschmidt GmbH), 50.6 parts by weight of T 80 toluene diisocyanate (index 110), and also a variable amount of KOSMOS® EF (tin ricinoleate from Evonik Goldschmidt GmbH) or KOSMOS® 29 (tin octoate from Evonik Goldschmidt GmbH) as salts not of the invention and, respectively, the tin carboxylates to be investigated in the invention from examples A and B.

The foaming process used for 400 g of polyol, and the amounts of the other formulation constituents were converted correspondingly. Table 1 collates the variable constituents of the formulations for foam examples 1 to 12.

For the foaming process, the polyol, water, amine, tin catalyst, and silicone stabilizer were mixed thoroughly, with stirring. Once the isocyanate had been added, the mixture was stirred with a stirrer at 3000 rpm for 7 sec. The resultant mixture was poured into a paper-lined wooden box (basal area 27 cm×27 cm). The resultant foam was subjected to the performance tests described hereinafter.

TABLE 2

Variable constituents of the formulations in foam examples 1 to 11. For each catalyst, two different usage amounts were selected.

| Example No. | of the invention | Salt[1] | | Catalyst [pphp] |
|---|---|---|---|---|
| 1 | No | a) | 0.15 | 0.20 |
| 2 | No | b) | 0.26 | 0.35 |
| 3 | Yes | c) | 0.20 | 0.27 |
| 4 | Yes | d) | 0.30 | 0.39 |
| 5 | Yes | e) | 0.23 | 0.30 |
| 6 | Yes | f) | 0.30 | 0.40 |
| 7 | Yes | g) | 0.31 | 0.41 |
| 8 | Yes | h) | 0.36 | 0.48 |
| 9 | Yes | i) | 0.54 | 0.73 |
| 10 | Yes | j) | 0.28 | 0.37 |
| 11 | Yes | k) | 0.34 | 0.45 |
| 12 | Yes | l) | 0.36 | 0.48 |
| 13 | Yes | m) | 0.28 | 0.37 |

[1]a) = Tin(II) salt of 2-ethylhexanoic acid
b) = Tin(II) salt of ricinoleic acid
c) = Tin(II) salt of acid Ab)
d) = Tin(II) salt of acid Ac)
e) = Tin(II) salt of acid Ad)
f) = Tin(II) salt of acid Ae)
g) = Tin(II) salt of acid Af)
h) = Tin(II) salt of acid Ag)
i) = Tin(II) salt of acid Ah)
j) = Tin(II) salt of acid Ai)
k) = Tin(II) salt of acid Aj)
l) = Tin(II) salt of acid Bb)
m) = Tin(II) salt of acid Bc)

Physical Properties of the Foams

The foams produced were assessed on the basis of the following physical properties:
 a) Amount by which the foam settles after the end of the rise phase (=settling):
  Settling or after-rise is calculated from the difference between foam height after direct escape of the blowing gases and 3 min. after the blowing gases had escaped from the foam. Foam height is measured here by a needle attached to a centimeter scale, at the maximum in the center of the convex upper surface of the foam.
 b) Foam height:
  The final height of the foam is determined by taking the amount of settling or after-rise (characterized by a negative sign, see Table 3) and subtracting this from or, respectively, adding this to the foam height after escape of the blowing gases.
 c) Density (D):
  This is determined as described in ASTM D3574-08, Test A, by measuring Core Density.
 d) Air permeability/porosity
 e) Compressive strength CLD, 40%
 f) Compression set for 70% compression for 22 h at 70° C.
 g) Rebound resilience (ball rebound test)

Tests e) to g) were carried out as in ASTM D1564-71.

Test d) was carried out as follows:

Method:

The air-permeability or porosity of the foam was determined by measuring dynamic pressure on the foam. The dynamic pressure measured has been stated in mm of alcohol column, where the lower dynamic pressure values characterize the more open foam. The values were measured in the range from 0 to 300 mm.

Apparatus:

The in-house nitrogen line was used for supply to the test apparatus, which was therefore attached thereto and is composed of the following parts connected to one another:

Reducing valve with manometer,

Screw-thread flow regulator,

Wash bottle,

Flow measurement equipment,

T-piece,

Applicator nozzle,

Scaled glass tube, containing alcohol

The wash bottle is only essential if the in-house line is not used for supply to the apparatus, but instead gas from an industrial cylinder is used.

Before first operation of the flow-measurement equipment, this requires calibration in accordance with the manufacturer's instructions, using the calibration curves supplied with the equipment, and it should be marked at 8 L/min=480 L/h.

The specification for the applicator nozzle is: edge length 100×100 mm, weight from 800 to 1000 g, gap width of outflow aperture 5 mm, gap width of lower applicator ring 30 mm.

The test liquid (technical grade alcohol (ethanol)) can be colored slightly in order to increase visual contrast.

Test Procedure:

The reducing valve is used to adjust the ingoing nitrogen pressure to 1 bar. The screw-thread flow regulator is used to regulate flow to the appropriate 480 L/h. Alcohol was used to bring the amount of liquid in the scaled glass tube to a level such that the pressure difference arising and readable is zero. The actual test on the test specimen uses five individual measurements, four at the four corners and one in the center of the test specimen. For this, the applicator nozzle is superposed flush with the edges at the corners, and the center of the test specimen is estimated. The pressure read-out is used to determine when constant dynamic pressure has been achieved.

Evaluation:

The upper measurement limit of the method is 300 mm liquid column (LC). For purposes of recording of the results, three different situations need to be distinguished:
 1. All five values are below 300 mm LC. In this situation, the arithmetic average is calculated and recorded.
 2. All five values are greater than or equal to 300 mm LC. In this situation, the value recorded is >300 or, respectively, 300.
 3. Among the five values measured there are a) explicitly determinable values, and b) values greater than or equal to 300: the arithmetic average is calculated from five values, where the value 300 is used for each of the b) values. The number of values greater than or equal to 300 is also recorded, separated by an oblique from the average value.

Example:

Four measured values: 180, 210, 118, and 200 mm LC; one measured value>300 mm LC, giving (180+210+118+200+300)/5. Entry in records: 202/1.

Table 3 collates the results.

TABLE 3a

Results of determination of physical properties

| Ex. No. | Cat [pphp] | Rise time [s] | Settling [cm][1] | Height [cm] | D[2] [kg/m³] |
|---|---|---|---|---|---|
| 1 | 0.15 | 117 | 0.0 | 30.2 | 24.20 |
|   | 0.20 | 97 | 0.1 | 30.8 | 24.38 |
| 2 | 0.26 | >180 | — | 31.8 | — |
|   | 0.35 | 116 | 0.1 | 31.0 | — |
| 3 | 0.20 | 145 | −0.2 | 29.0 | 24.38 |
|   | 0.27 | 116 | −0.2 | 30.3 | 23.99 |
| 4 | 0.30 | 150 | 0.0 | 29.5 | 24.30 |
|   | 0.39 | 125 | 0.0 | 30.0 | 24.40 |
| 5 | 0.23 | 144 | 0.0 | 30.4 | — |
|   | 0.30 | 121 | 0.0 | 30.2 | 24.37 |
| 6 | 0.30 | 143 | −0.1 | 29.6 | — |
|   | 0.40 | 122 | −0.2 | 30.0 | 24.80 |
| 7 | 0.31 | 142 | −0.4 | 30.0 | — |
|   | 0.41 | 120 | 0.0 | 30.3 | 24.15 |
| 8 | 0.36 | 139 | 0.0 | 29.2 | 24.62 |
|   | 0.48 | 115 | −0.1 | 30.8 | 24.22 |
| 9 | 0.54 | >180 | — | 29.0 | — |
|   | 0.73 | 156 | −1.0 | 28.8 | — |
| 10 | 0.28 | 145 | −0.1 | 29.4 | 24.18 |
|   | 0.37 | 119 | −0.2 | 29.9 | 24.45 |
| 11 | 0.34 | 139 | −0.1 | 29.4 | 24.09 |
|   | 0.45 | 116 | −0.1 | 29.9 | 24.43 |
| 12 | 0.36 | >180 | — | 24.3 | — |
|   | 0.38 | >180 | — | 24.3 | 22.30 |
| 13 | 0.28 | 155 | −0.2 | 29.6 | 24.42 |
|   | 0.37 | 126 | 0.0 | 29.9 | 24.45 |

[1]missing value means: no escape of blowing gases occured from the foam.
[2]missing values mean: not determinable, because cracks occur in the foam.

TABLE 3

Results for determination of physical properties

| Ex. No. | Porosity [mm] | CLD 40% [kPa] | Compression set | Rebound [cm] |
|---|---|---|---|---|
| 1 | 8 | 3.5 | 2.8 | 41 |
|   | 20 | 4.3 | 3.6 | 39 |
| 2 | 5 | — | — | — |
|   | 6 | — | — | — |
| 3 | 8 | 3.4 | 2.8 | 41 |
|   | 39 | 4.3 | 3.4 | 36 |
| 4 | 8 | 3.5 | 2.6 | 40 |
|   | 29 | 4.3 | 3.6 | 38 |
| 5 | 10 | — | — | — |
|   | 13 | 4.0 | 2.7 | 36 |
| 6 | 23 | — | — | — |
|   | 31 | 4.3 | 3.5 | 37 |
| 7 | 7 | — | — | — |
|   | 12 | 3.9 | 2.8 | 39 |
| 8 | 9 | 3.5 | 3.0 | 40 |
|   | 34 | 4.4 | 3.4 | 36 |
| 9 | 8 | — | — | — |
|   | — | — | — | — |
| 10 | 8 | 3.3 | 3.0 | 41 |
|   | 17 | 4.1 | 3.0 | 38 |
| 11 | 9 | 3.4 | 2.8 | 40 |
|   | 21 | 4.2 | 3.3 | 39 |
| 12 | 7 | — | — | — |
|   | 15 | 3.7 | 3.0 | 34 |
| 13 | 10 | 3.5 | 3.0 | 40 |
|   | 13 | 3.8 | 3.5 | 37 |

As can be seen from the settling values, addition of the metal salts of the oligomeric and polymeric acids of the invention can produce stable polyurethane foams. The parts by weight of the respective catalyst were calculated in such a way that the tin content is equimolar in the systems to be compared. Use of the catalysts of the invention, when compared with the use of known catalysts, does not impair the physical properties of the foams. In contrast to Kosmos EF, even small usage amounts give stable open-cell foams, whereas severe cracks occur in the foam with Kosmos EF at identical tin content.

Measurement of Emissions

Acid emission is determined by a method based on the Mercedes Benz test specification PB VWT 709.

The method for thermodesorption followed by coupled gas chromatography/mass spectrometry (GC/MS) is described below.

a) Measurement Technique:

A "TDS2" thermodesorber with specimen changer from Gerstel, Mülheim, is used in conjunction with a Hewlett Packard HP6890/HP5973 GC/MSD system for the thermodesorption process.

b) Measurement Conditions:

| | |
|---|---|
| Thermodesorption | Gerstel TDS 2 |
| Desorption temperature | 90° C. |
| Desorption time | 30 min |
| Rate | 60 ml/min |
| Transfer line | 280° C. |
| Cryofocusing | HP 6890 PTV |
| Liner | Glass vaporizer tube with silanized glass wool |
| Temperature | −150° C. |

| | |
|---|---|
| GC | HP 6890 capillary GC |
| Injector | PTV Split 1:50 |
| Temperature profile | −150° C.; 3 min; ↗720° C./min; 280° C. |
| Column | 60 m * 0.25 mm Optima 5 MS dF 0.5 μm |
| Flow rate | 1 ml/min const. flow |
| Temperature profile | 50° C.; 5 min; ↗3° C./min; 92° C.; ↗5° C./min; 160° C.; ↗10° C./min; 280° C.; 20 min |
| Detector | HP MSD 5973 |
| Mode | Scan 29-350 amu 2.3 scans/sec |
| Evaluation | Evaluation of total ion stream chromatogram Calculation of 2-ethylhexanoic acid peak as toluene equivalent | c) Calibration

For calibration, 1 μl of a mixture of toluene and hexadecane in pentane (in each case 0.6 mg/ml) is charged to a clean adsorption tube containing Tenax TA (mesh 35/60) and subjected to measurement (desorption 5 min; 280° C.)

d) Specimen Preparation 10 mg of foam, divided into three part-specimens, are inserted into a thermodesorption tube. Care is taken here to avoid compressing the foam.

e) Evaluation

To quantify acid emission, the peak recognized by means of the mass spectrum as, for example, 2-ethylhexanoic acid is determined as ppm of toluene equivalent by taking its peak area and using the response factor of the toluene from the calibration process.

Table 4 collates the results for the emissions occurring. In each case the larger amount of catalyst was used to produce the foams.

TABLE 4

Results of emission determination

| Ex. No. | of the invention | Cat [pphp] | Test chamber emission [μg/m³] | VOC emission [μg/g] | FOG emission [μg/g] |
|---|---|---|---|---|---|
| 1 | no | 0.20 | 60 | 440 | <10 |
| 2 | no | 0.43 | 80 | 10 | <10 |
| 3 | yes | 0.27 | 60 | 20 | <10 |
| 4 | yes | 0.39 | 60 | 10 | <10 |
| 5 | yes | 0.30 | 50 | 10 | 10 |
| 6 | yes | 0.40 | 40 | 10 | <10 |
| 7 | yes | 0.41 | 80 | 20 | 90 |
| 8 | yes | 0.48 | 170 | 60 | 10 |
| 9 | yes | 0.90 | 240 | 50 | 20 |
| 10 | yes | 0.37 | 20 | 10 | 10 |
| 11 | yes | 0.45 | 70 | 10 | 10 |
| 12 | yes | 0.48 | 60 | 20 | <10 |
| 13 | yes | 0.37 | 50 | 10 | 10 |

From table 4 it can be concluded that the emission values of the foams produced are mostly very small. However, it is noticeable that the foam example No. 1 gives heavy emission, at 440 μg/g. This high value is attributable to the emission of 2-ethylhexanoic acid (413 μg/g).

The relatively high emission values of foams Nos. 8 and 9 in the test chamber and VOC test are attributable to the emission of acetophenone, which is produced at relatively high temperatures from the styrene oxide units of the catalysts used.

What is claimed is:

1. A polyurethane system comprising a compound of formula (I)

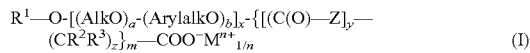

where
R$^1$=linear, branched or cyclic hydrocarbon moiety,
Z=saturated or unsaturated, aliphatic, aromatic or mixed-aliphatic-aromatic, linear, branched, or cyclic hydrogen moiety having from 1 to 30 carbon atoms,
R$^2$ and R$^3$=mutually independently H or a linear or branched hydrocarbon moiety having from 1 to 10 carbon atoms,
x=from 1 to 10
y=0 or an integer >1,
z=0 or an integer >1,
m=an integer >1,
n=an integer >1,
M=tin,
AlkO=identical or different alkylene oxide units,
ArylalkO=identical or different arylalkylene oxide units,
a=from 0 to 20,
b=from 0 to 20, and
a+b≥1, where the units indicated by the indices a and b can have blockwise or random distribution.

2. The polyurethane system as claimed in claim 1, wherein it comprises from 0.01 to 5% by weight of compound (I), based on the entire composition of the polyurethane system.

3. The polyurethane system as claimed in claim 1, wherein the polyurethane system is a polyurethane coating, a polyurethane adhesive, a polyurethane sealant, a polyurethane elastomer, a rigid polyurethane foam, a flexible polyurethane foam, a viscoelastic foam, an HR foam, a semirigid polyurethane foam, a thermoformable polyurethane foam or an integral foam.

4. The use of the polyurethane system as claimed in claim 1, wherein said polyurethane system is a component of a refrigerator-insulation material, insulation sheet, sandwich element, pipe insulation, spray foam, single- & 1.5-component canister foam, wood-imitation product, modeling foam, packaging foam, mattress, furniture cushioning, automobile-seat cushioning, headrest, instrument panel, automobile-interior cladding product, automobile roof lining, sound-deadening material, steering wheel, shoe sole, carpet-backing foam, filter foam, sealant foam, sealant, or adhesive.

5. The polyurethane system as claimed in claim 1, further comprising one or more organic solvents.

6. The polyurethane system as claimed in claim 1, wherein R$^1$ is a linear or branched alkyl moiety having from 2 to 4 carbon atoms.

7. The polyurethane system as claimed in claim 1, wherein Z is a cyclic hydrogen moiety having from 1 to 30 carbon atoms and at least one heteroatom selected from nitrogen, oxygen, sulfur, and phosphorus.

8. The polyurethane system as claimed in claim 1, wherein R$^2$ and R$^3$ are both hydrogen.

9. The polyurethane system as claimed in claim 1, wherein R$^2$ and R$^3$ are both methyl.

10. The polyurethane system as claimed in claim 1, wherein the indices a and b have blockwise distribution.

* * * * *